United States Patent [19]

Ledford et al.

[11] 4,242,903
[45] Jan. 6, 1981

[54] MANUALLY OPERATED PINCER MECHANISM FOR PIPELINES

[76] Inventors: James B. Ledford, 4711 Cowden Pl., Yakima, Wash. 98908; Edward Niederer, Jr., 19330-3rd Northwest, Seattle, Wash. 98177

[21] Appl. No.: 61,823

[22] Filed: Jul. 30, 1979

[51] Int. Cl.³ .................................... B21J 13/02
[52] U.S. Cl. ........................... 72/413; 72/448; 72/453.01; 72/455; 100/257; 251/5
[58] Field of Search ............... 72/413, 455, 453.01, 72/462, 446, 448, 470, 474, 416; 251/5, 8; 100/214, 257

[56] References Cited

U.S. PATENT DOCUMENTS

| | | | |
|---|---|---|---|
| 2,098,548 | 11/1937 | Kick | 251/5 |
| 2,439,725 | 4/1948 | Frost | 100/257 |
| 2,502,072 | 3/1950 | Bender | 100/257 |
| 2,742,853 | 4/1956 | Knelson | 100/214 |
| 3,117,615 | 1/1964 | Graven | 251/8 |
| 3,283,699 | 11/1966 | Hawkins | 100/257 |
| 3,589,668 | 6/1971 | Gill | 251/8 |
| 3,858,431 | 1/1975 | Miller | 100/257 |
| 3,937,050 | 2/1976 | Nicholson | 251/5 |
| 4,169,412 | 10/1979 | Stelmasik | 100/257 |
| 4,197,795 | 4/1980 | Hawkins | 100/257 |

*Primary Examiner*—Francis S. Husar
*Assistant Examiner*—Gene P. Crosby
*Attorney, Agent, or Firm*—Cole, Jensen & Puntigam

[57] ABSTRACT

Manually operated pincer mechanism for rapid shutoff of a pipeline that has developed a break or leak. The pincer mechanism is actuated by a manually operated hydraulic jack. The jaws are designed to shutoff small diameter steel pipe with the lower jaw in the upper position and with adapter members attached to both jaws with the lower jaw in the lower position is able to squeeze off plastic pipe up to a larger specified diameter. Removal of the plastic adapter jaws and with the lower jaw in the lower position permits booming down on patches for steel pipe up to a larger specified diameter for welding.

7 Claims, 9 Drawing Figures

MANUALLY OPERATED PINCER MECHANISM FOR PIPELINES

BACKGROUND OF THE INVENTION

This invention relates to the emergency shutoff of a section of pipeline and more particularly to a pincer mechanism which may be used to squeeze off small diameter plastic or steel pipe on one or both sides of a break or leak.

Those skilled in the art are aware of the problem of time involved in shutting down a section of pipeline that has developed a break or leak. In the case of gas, a leak in the line is always potentially dangerous and therefore, it is important if not critical that the break be isolated and shut off at the earliest possible moment. One current practice is to close the nearest valves in the system on either side of the break in the line. Since valves in the line may be some distance apart, depending upon such factors as population density and nature of the area served, a substantial amount of damage may be done before the valves can be closed. Also, shutting the valves may involve interruption of service to a number of customers if the section controlled by the valves is large. One practice for stopping leaks is to attach fittings on both sides of the break in order to stop flow to the point of the break. Installation of fittings requires time and may be dangerous for the workmen. In any event, a hole or trench must be dug to expose the break in the line. Utilities such as gas companies are criticized for the length of time required to close off leaks and frequently are also criticized for the size of the section of pipe distribution line which is shut down. If the fluid excaping from the pipe is liquid the tendency for the liquid to wash away supporting soil and undermine pipe support may increase the danger to workmen as well as the public.

While manually operated pipe pincer units have been offered in the marketplace for some time, nevertheless none are known which are specifically designed to do a combination of jobs, that is to service both small diameter steel and plastic lines and also to be used as a booming-on tool when steel pipe is being patch welded.

SUMMARY OF THE INVENTION

The pincer mechanism comprises a generally U-shaped frame which is closed at its upper end and open at the lower end. Double spaced apart frame members extend downwardly from a top cross-frame piece. A movable upper jaw is provided with a jack support plate on its upper edge. On the underside of the top cross frame piece is a receiving member which is engaged by the extendible neck of the jack. The plate attached to the movable jaw is engaged by the base of the hydraulic jack. A lower jaw is provided and the frame is designed in such a way that the lower jaw has an upper position when the pincer is being used to squeeze off steel. The lower position for the lower jaw is used when the pincer is to squeeze off plastic pipe and for holding patches for welding. The wider separation for plastic is needed in order to accommodate plastic jaw adapters attached to the basic jaw blades.

Accordingly, it is among the many features, advantages and objects of the invention to provide a pipe pincer mechanism which is simple, inexpensive to construct and durable. The mechanism is designed so that, whether plastic or steel, it can be slipped over the pipe and the lower jaw slipped into position and the pinch off process completed in a few minutes. No large auxiliary equipment is required for the device and it only requires one man for operation. It is a versatile tool in that it will pinch small diameter steel as well as larger plastic. The device is small enough so that it can be carried in service trucks. The manually operated jack is detachably held in place. The device is light, simple and yet versatile. There is no need to wait for fittings if they are not readily available because the pincer unit is at hand. The device will have as much advantage for water districts, utilities and companies carrying various fluids in pipe lines or piping systems as it does for natural gas companies. The device will function regardless of internal pressures in the pipe.

DESCRIPTION OF PREFERRED EMBODIMENT

Figure 1:
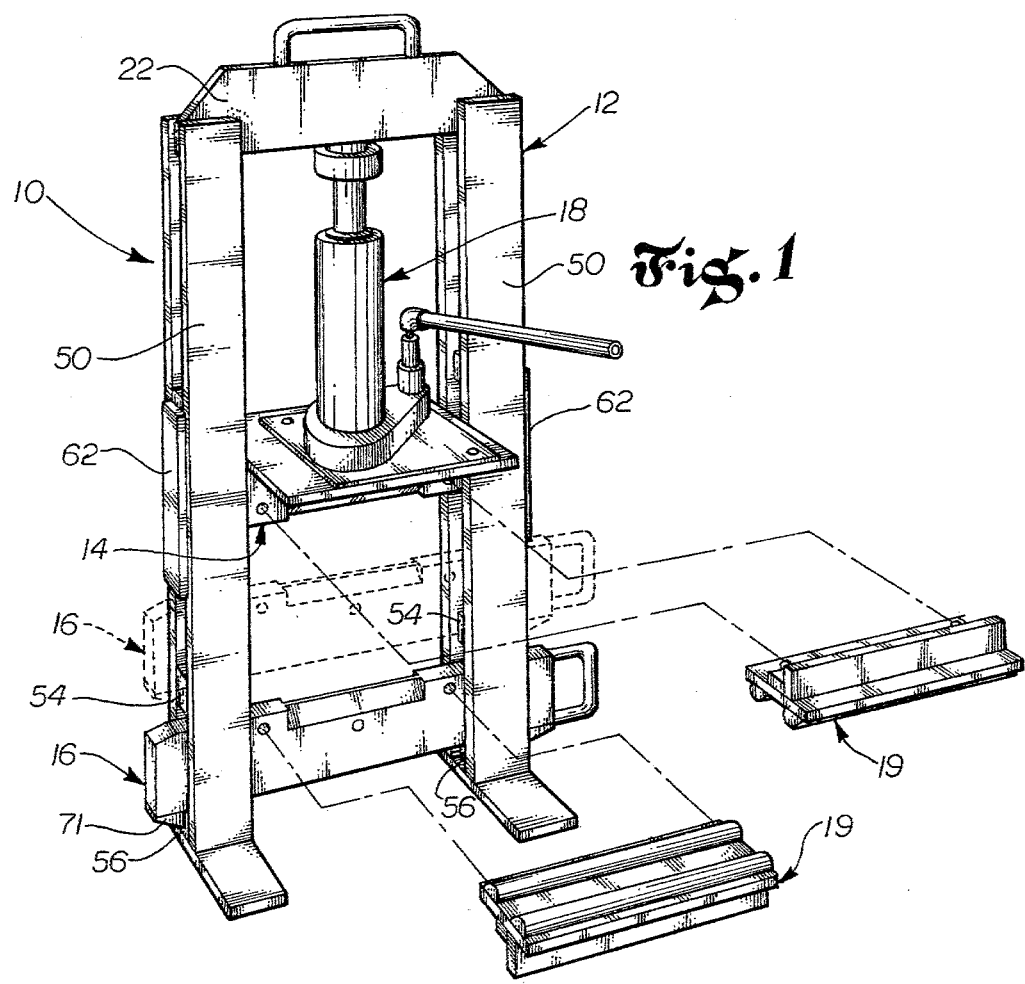
FIG. 1 is a perspective view showing the invention.

FIG. 1 shows a perspective view of the invention generally designated by the number 10 and having main frame 12, upper jaw assembly 14, lower jaw assembly 16 and manually operated jack 18.

Figure 2:
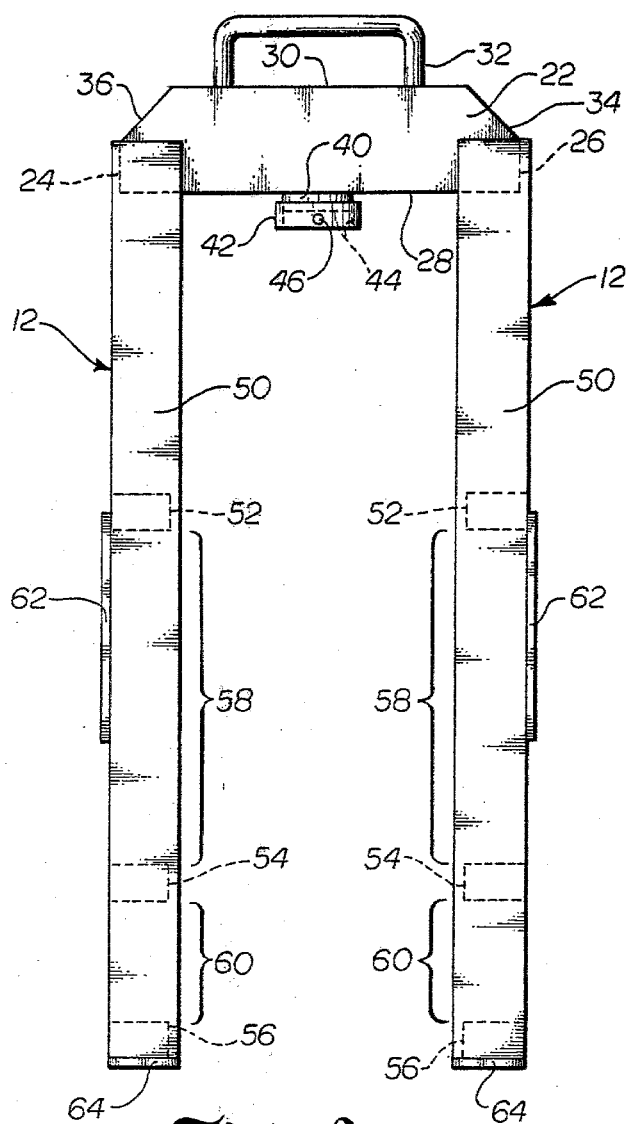
FIG. 2 is a front elevation of the invention showing details of construction thereof.

In FIG. 2, it will be seen that a main upper cross-member 22 has end edges 24 and 26, bottom edge 28 and top edge 30. A carrying handle 32 is attached to the upper edge 30. Angled edges 34 and 36 may be provided, if desired. Centrally located on the bottom edge 28 of the cross-frame member 22 is a circular plate 40 secured to the under edge as by welding which in turn supports a cylindrical member 42 which can be cut from an item such as 2" standard pipe. Secured by welding to the plate 40 the cylindrical member 42 defines a recess cavity 44 into which the upper end of the manually operated jack may be received. Diametrically opposed holes 46 align with a hole in the neck of the jack to retain the upper end of the jack in position in the pincer unit.

Figure 3:
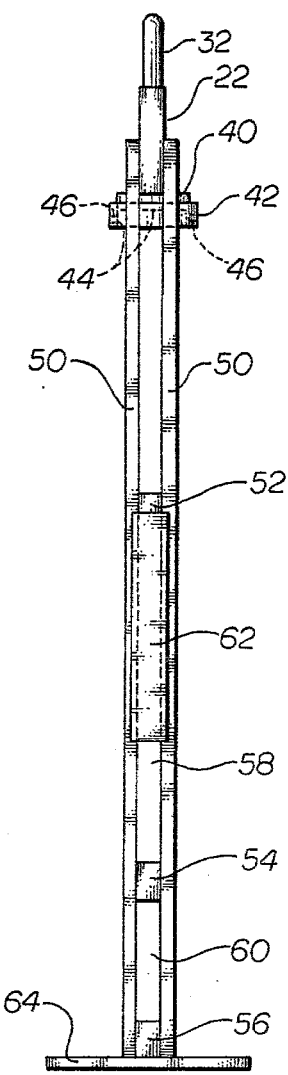
FIG. 3 is a side elevation view showing additional detailed construction of the invention.

Depending downwardly from the ends 24 and 26 of the cross frame piece 22 are arm members 50 which are approximately 2 feet 3 inches long. It will be noted by reference to both FIGS. 2 and 3 that the arm members 50 on each end of the cross frame piece are double members spaced apart to thickness of the cross frame piece 22. A series of spacers 52, 54 and 56 of the same thickness as member 22 are secured between the double frame members at predetermined distances from cross piece 22. Thus, a space 58 is left between spacers 52 and 54 and another space 60 is defined between spacers 54 and 56.

Retainer members 62 are attached to the outside edge of the arms 50 in the manner shown with the lower end of retainer 62 being spaced a predetermined distance above spacer 54 to allow insertion of the lower blade 16 into its upper position. Feet members 64 are attached to the lower end of arms 50 so that the unit will stand of its own accord.

Figures 4, 5:
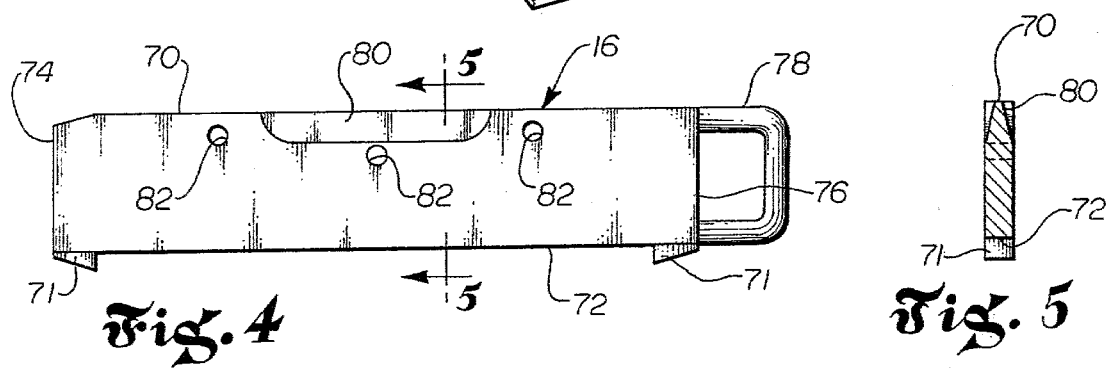
FIGS. 4 and 5 are front and end elevation views respectively showing details of the lower jaw.
Figures 6, 7:
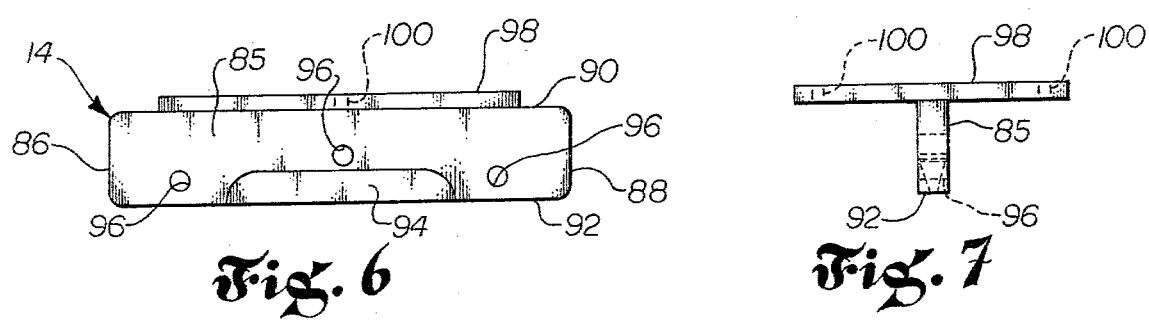
FIGS. 6 and 7 are front and end elevation views respectively showing details of the upper jaw.

FIGS. 4 and 5 show details of the lower blade 16. The blade is a generally rectangular piece of steel plate having upper jaw edge 70, lower edge 72, end edges 74 and 76 and gripping handle 78 at one end. It will be noted that a tapered area 80 is provided for handling the smaller diameter steel and that holes 82 are appropriately provided for receiving the adapter jaws 19, the details of which will be described more fully hereinafter. It will be noted that stop members 71 are attached to the outer ends of lower edge 72 to engage spacer member 54 and 56 for preventing spreading of arms 50.

The upper blade assembly 14 also comprises a flat steel plate blade having ends 86 and 88, top surface 90 and bottom edge 92 with tapered section 94. Holes 96 are provided as with the lower blade for receiving a duplicate adapter jaw 19. A flat jack support plate 98 is secured to the upper edge of jaw 85 which in turn also has holes 100 which align with holes in the base of the jack for receiving pins for retaining the jack base thereon.

Figure 8:
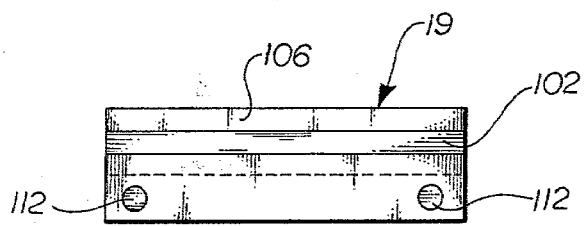
FIGS. 8 and 9 are front and end elevation views respectively of the plastic pipe adapter jaws.
Figure 9:
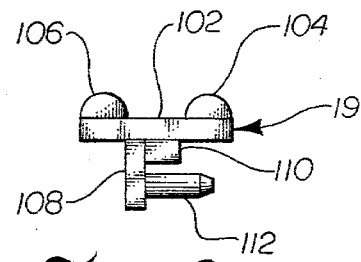

FIGS. 8 and 9 show a single adapter jaw for the plastic since identical adapters are used on the upper and lower jaws. The adapter 19 comprises a base plate 102 which in turn supports half round members 104 and 106 on the upper surface. Depending from the underside of plate 102 is alignment plate 108 with support block 110. Pins 112 are received in the two outer holes and welded into position to be received in either holes 96 and 82 of the upper and lower jaws, respectively. The center hole 82 and 96 of the lower and upper jaws 16 and 14 are used to hold weld patches equipped with a holding bracket which includes an aligned hole to allow the patch to be pinned to the upper or lower jaw and held in place to be boomed onto the steel pipe and then welded.

What is claimed is:

1. A manually operated pipe pincer mechanism, comprising:
   a. a generally U-shaped support frame consisting of a top cross frame member and including elongated depending arms from each end of said cross frame member, said arms being comprised of double, spaced apart bar sections,
   b. spacer and jaw support members between the bar members of each of said arms such that an upper jaw space and a lower jaw space are defined,
   c. a slidably removable lower jaw blade supported between said bar members in one of at least two support positions by said spacer members,
   d. an upper jaw blade received between said bar members and including a support plate attached to the upper edge thereof, and
   e. a manually operated hydraulic jack detachably supported on and between said support plate on said upper jaw blade and the bottom edge of said cross frame member.

2. The pipe pincer mechanism of claim 1 and in which there are three of said spacers between the bars of said arm members, the lower said two spacers defining two support positions for the lower jaw blade.

3. The pipe pincer mechanism of claim 2 and in which said lower jaw blade is provided with bracket members on the outer ends of the lower edge and which engage the lowermost spacers to prevent said arm members from spreading.

4. The pipe pincer mechanism of claim 3 and in which at least a centrally located portion of the pipe engaging edge of each jaw blade is tapered for engagement with small diameter steel pipe.

5. The pipe pincer mechansim according to claim 1 and in which adapter jaw members for plastic pipe are detachably secured to each of said jaw blades.

6. The pipe pincer mechanism according to claim 5 and in which said adapter jaw members comprise a generally elongated flat bar member with spaced apart and at least partially round pipe engaging members secured thereto, and said adapter jaw members having means for being detachably secured to said upper and lower jaw blades.

7. The pipe pincer mechanism according to claim 6 and in which said adapter jaw members include two half round engaging members for plastic pipe secured to said flat bar member.

* * * * *